Aug. 22, 1933.   G. E. PICKUP   1,923,882
GENERATOR DEVICE FOR LIQUID FUEL STOVES
Filed Dec. 3, 1930
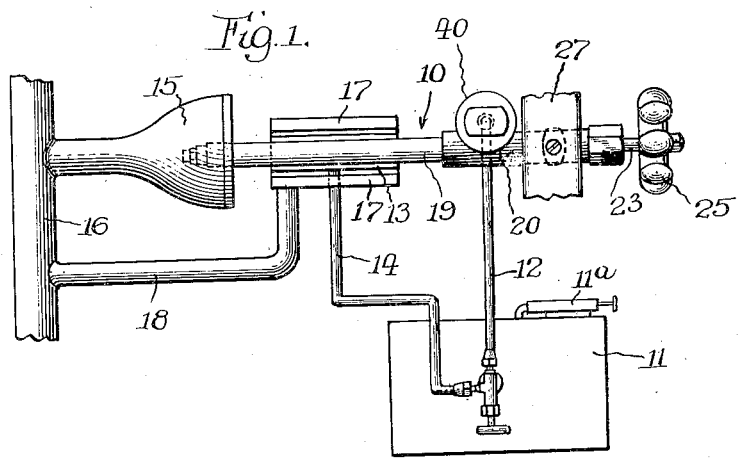
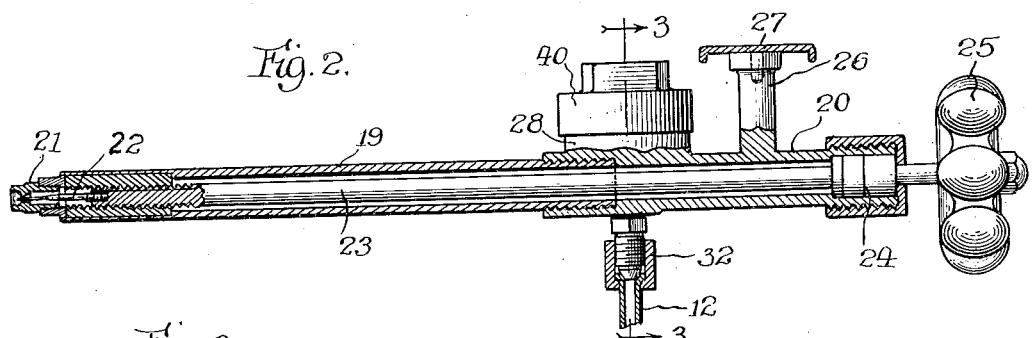
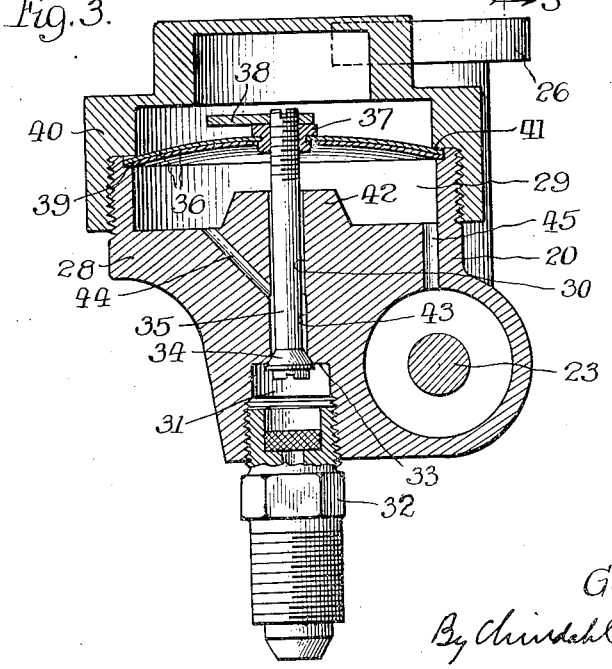
Inventor:
George E. Pickup,
By Churchill Parker & Carlson
Attys.

Patented Aug. 22, 1933

1,923,882

UNITED STATES PATENT OFFICE 1,923,882

GENERATOR DEVICE FOR LIQUID FUEL STOVES

George E. Pickup, Newark, Ohio, assignor to The Wehrle Company, Newark, Ohio, a Corporation of Ohio Application December 3, 1930. Serial No. 499,661

2 Claims. (Cl. 158—42.4)

The invention relates to generator devices for liquid fuel stoves, which devices are generally characterized by the conversion therein of liquid fuel into gaseous fuel upon the application of heat.

It is an object of the present invention to provide a new and improved device of this character in which the flow of liquid fuel to the device is under the control of a thermally-responsive unit (such as a thermostatically-operated valve) so located or disposed with respect to the generator that the unit is indirectly heated during the application of heat to the generator.

Another object of the invention is to provide, in a device of this character, a novel arrangement of a thermally-responsive control unit which is directly exposed to the flow of the liquid controlled thereby, in order that a rapid cooling of the unit and consequent immediate actuation thereof is produced should the source of heat, for any reason, fail to maintain the temperature of the unit above a certain predetermined point.

A further object of the invention is to provide, in a generator device, a thermally-responsive control means which is instantly operative, when a certain predetermined temperature is reached, to open or close the fuel line to the generator with a rapid and positive movement.

More specifically stated, it is an object of the invention to provide a new and improved generator device in which a generator tube, which is adapted to be heated to convert liquid fuel into fuel gas, has a casing intimately secured thereto or integrally formed therewith, and provided with an enlarged chamber in which a rapidly acting, thermally-responsive unit is positioned for actuation of a valve arranged to control the flow of fuel to the generator tube accordingly as heat applied to the generator tube indirectly causes the operation of the thermally-responsive unit.

Another object of the invention resides in the provision of a device of this character which is simple, compact and sturdy in construction, which is readily accessible and convenient for inspection of the operative parts, and which is efficient in operation.

Other objects and advantages will become apparent from the following detailed description and from the accompanying drawing, in which:

Figure 1 is a substantially diagrammatic illustration of a liquid fuel stove system embodying the present invention.

Fig. 2 is a longitudinal central section of the generator device.

Fig. 3 is a transverse section of the device taken substantially on the line 3—3 of Fig. 2.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In describing the present invention, I have arbitrarily chosen to show the device as being embodied in a generally well-known type of liquid fuel stove, the various operative elements of which are diagrammatically illustrated in plan in Fig. 1. It will, of course, be understood that the present invention may be used in connection with many suitable liquid fuel stove systems other than that illustrated.

With reference to Fig. 1, 10 indicates generally the liquid fuel generator in which the conversion of liquid fuel to gaseous fuel or vapor is produced. Liquid fuel is supplied to the generator from a supply tank 11 through a conduit 12, the feed from the supply tank being effected by means of pneumatic pressure created within the tank by a pump 11ª or other suitable means.

Initial heating of the generator device, in order to cause what is sometimes termed "pregeneration" of gaseous fuel, is obtained by means of a burner 13 located beneath a portion of the generator device. This burner 13 is supplied with fuel vapor for the pregenerating operation from the upper portion of the supply tank 11 through a conduit 14. Initial heating of the generator device converts liquid fuel within the generator device into gaseous fuel which is discharged from the device into a mixing chamber 15 where the gas is mixed with air to form a highly combustible mixture. The mixture, in turn, passes from the mixing chamber into a manifold 16 to which a generator burner 17 is connected by a conduit 18. Usually other burners (not shown) are also connected with the manifold.

As soon as sufficient gaseous fuel has been produced by pregeneration to operate the generator burner 10, the conduit 12 from the supply tank to the generator is opened, the conduit 14 from the supply tank to the pregenerator burner is closed, and the further operation of the generator is carried on by the heat from the generator burner 17.

It has been found in systems of this character that liquid fuel may, by chance, be admitted to the generator device before the temperature of said device has reached a point where the liquid fuel admitted will be completely converted into gaseous fuel. As a result, a certain amount of the liquid fuel will be carried, along with the gaseous fuel, into the manifold and subsequently into the burners. Obviously, the presence of liquid fuel in the manifold is undesirable and is quite dangerous. This same result occurs when, for any reason, the generator burner becomes accidentally extinguished while the liquid fuel is being supplied to the generator device. In the present invention flooding of the manifold is avoided through the provision of an automatically operated, thermally-responsive valve means which controls the flow of liquid fuel from the supply tank to the generator device.

More particularly referring to the generator device per se, as illustrated in Figs. 2 and 3, the portion of the generator device to which heat is applied is in the form of a tube 19 arranged to be horizontally disposed above and adjacent the pregenerator burner 13 and the generator burner 17. One end of the tube, in this instance the right-hand end as seen in Figs. 1 and 2, has a screw threaded or other suitable connection with a tubular extension or fitting 20 which forms a continuation of the generator tube.

The other end of the generator tube carries a nozzle member 21 arranged to discharge gaseous fuel into the mixing chamber 15. A suitable needle valve mechanism 22 controls the passage of gaseous fuel through the nozzle 21, which valve is operated from a convenient point on the front of the stove by means of a rod 23 extending substantially axially of the generator tube 19 and fitting 20 through a packing gland 24 on the free end of the fitting. A suitable handle 25 facilitates rotation of the rod.

The fitting 20 is preferably formed of brass or some other material which has a high coefficient of heat conductivity and preferably includes a bracket or lug 26 formed integrally therewith by which the device may be secured to a part 27 of the frame of the stove. Intimately connected to the fitting, as by integral formation therewith, is a casing 28 having at one side thereof an open-face, substantially-circular recess or chamber 29 (Fig. 3). A bore 30 is formed through the casing on the axis of the chamber, which bore communicates at one end with the chamber and at the other end is enlarged, as at 31, and internally screw threaded to receive a nipple 32. The nipple, in turn, is connected with the conduit 12 from the liquid fuel supply tank 11.

In forming the enlarged portion of the bore 31, an internal shoulder 33 is provided in the bore which constitutes a valve seat for a valve 34. The valve 34 is provided with a valve stem 35 which extends through the bore 30 into the chamber 29.

The end of the valve stem within the chamber is arranged to be connected to a thermally-responsive means by which the valve 34 is seated and unseated in accordance with the temperature variations of the device. To this end, one or more thermostatic wafers or disks 36 of the bimetallic type are rigidly secured on the end of the valve stem. Preferably, for purposes of adjustment, this mounting is attained by means of a screw threaded engagement of the valve stem 35 with a bushing 37 rigidly carried by one of the thermostatic disks. If desired, a lock-nut 38 may be employed to maintain the desired adjustment.

As may be seen in Fig. 3, the thermostatic disks are slightly concave or dish-shaped and the relative sizes and disposition of the parts is such that the peripheral edges of the disks engage a rabbeted groove 39 formed in the wall or walls of the casing 28 adjacent the open face thereof. A closure for the open face of the casing is provided in the form of a cap 40 arranged to be screw threaded onto the casing. Internally, the cap has an annular shoulder 41 arranged to engage the peripheral edge of the exposed face of the outer thermostatic disk 36 to hold said disks firmly seated in the groove 39. Preferably, the cap 40 has a squared outer portion to facilitate removal thereof, whereupon all of the parts are accessible for inspection, replacement, adjustment, or repair.

The concave formation of the disks provides a thermally-responsive unit which operates with a rapid and positive or "snap" action. That is to say, the concave disks resist the tendency to change under heat variations until a predetermined temperature is reached, at which temperature the disks move or rather snap to an opposite concavity. By suspending the valve from the center of the disks and holding the peripheral edges of the disks against movement, the snap movement of the disks is utilized as a valve opening or valve closing movement. Consequently, the valve 34 will be opened or closed rapidly and positively.

An intermediate portion of the bore 30 adjacent the shoulder 33 is enlarged, as at 43, and a passageway 44 extending between said enlarged portion and the chamber 29 permits liquid fuel to flow into the chamber when the valve 34 is open. A second passageway 45, extending between the chamber and the tubular portion of the fitting 20, permits the liquid fuel to flow from the chamber through the fitting into the generator tube 19. Preferably, the passageways 44 and 45 are located on diametrically opposite sides of the chamber so that the liquid fuel, in flowing through the chamber, will fill the chamber and come into contact with the thermostatic disks 36. If desired, an outstanding boss 42 may be provided within the chamber in surrounding relation to the bore 30 to substantially define a peripheral channel within the chamber and adjacent the disks.

It will be evident from the foregoing that the casing 28 is positioned laterally of the generator tube so as to be substantially out of the direct range of the generator burner 17. Therefore, in adjusting the device for operation it will be necessary to adjust the thermostatic disks on the valve stem in such manner that the valve will be open only when the generator tube has been heated to or above a temperature at which all of the liquid fuel flowing thereto will be efficiently converted into gaseous fuel.

Obviously, the temperature at which the thermostatic disks open the valve will be considerably less than the temperature of the generator tube since the heat, to which the unit is responsive, reaches the unit only by being conducted thereto through the metallic tube and fitting or to some extent by the radiation of heat from the generator burner. This feature is advantageous in that it obviates the necessity of exposing the thermally-responsive unit directly to the heat of the burner, thereby permitting a smaller, more delicate and more sensitive unit to be employed with the consequent result that a more accurate control of the flow of liquid fuel is attained.

In the operation of the device, as it is used in the present stove system, the pregenerator burner 13 is first ignited to produce an initial heating of the generator tube. At the same time, the needle valve 22 which controls the flow of gaseous fuel from the generator device through the nozzle 21 may be opened. The initial heating of the generator tube is continued until sufficient heat has been conducted to the thermally-responsive unit to snap the valve 34 open, thereby allowing liquid fuel to flow to the generator tube through the bore section 43, passageway 44, chamber 29, second passageway 45, and fitting 20. Subsequently, as long as the generator tube is heated, the valve will remain open should the generator tube become cooled below the temperature at which it will convert all of the liquid fuel into gaseous fuel, the valve 34 will be instantly closed. The action of the thermal-unit in closing the valve is exceedingly sensitive when for any reason heating of the generator tube ceases. This is due to the fact that the thermostatic disks are located in the chamber 29 which forms a part of the passageway through which liquid fuel flows to the generator tube. The thermostatic disks are, therefore, exposed to the cooling influence of the inflowing and relatively cool stream of liquid fuel from the supply tank. Hence, the temperature of the thermostatic disks cannot ever be increased greatly above the valve actuating temperature of the disks and the entire device will be exceedingly sensitive to relative slight variations of temperature.

It will be apparent from the foregoing that a novel type of generator device for converting liquid fuel into gaseous fuel has been provided which is simple in construction and efficient in operation and is effective positively and automatically to control the flow of liquid fuel to the generator.

I claim as my invention:

1. A liquid fuel stove having, in combination, a gaseous fuel burner, a generator for gasifying liquid fuel for delivery to said burner, said generator comprising a tube heated by the flame from said burner and having a discharge orifice at one end, a metallic fitting having an elongated bore into which the other end of said tube is fitted, a needle valve for said discharge orifice having an operating rod extending through said tube and said bore, said fitting having a lateral extension in a heat conducting relation to said fitting and said tube and having a chamber formed therein, a disk-shaped bimetallic thermostatic element mounted within said chamber with its edges seated in the sides of said chamber, fuel supply means connected to said extension adjacent to said bore, said extension having a second bore formed therein extending transversely past said first mentioned bore and connecting said fuel supply means with said chamber, a valve and an operating rod in the second bore with the rod extending into said chamber and operatively connected to said element, said extension having a passage opening from said chamber into said first mentioned bore, and a passage extending from said second bore into said chamber in spaced relation to the other passage and on the same side of said thermostatic element.

2. The combination of a gaseous fuel burner, a generator tube for gasifying liquid fuel for delivery to said burner, said generator tube being heated by the flame from said burner and having a discharge orifice at one end, a metallic fitting having an elongated bore, said fitting being connected to the other end of said tube with the tube and bore in alinement, a needle valve for said discharge orifice having an operating rod extending through said tube and said bore, said fitting having a lateral extension with a chamber formed therein, a disk-shaped bimetallic thermostatic element mounted in a substantially horizontal position within said chamber with its edges seated in fluid tight relation in the sides of said chamber, said chamber having an inlet passage from a source of liquid fuel extending substantially vertically into said chamber and an outlet passage to said tube, said passages opening into said chamber on the same side of said element and on opposite sides of the center of the chamber, a valve in said inlet passage controlled by said element, and a boss projecting into said chamber from one end thereof to limit the movement of said element in a valve-opening direction and to cooperate with said thermostatic element when the valve is in its open position to form a circuitous channel adjacent the disk and connecting said passages.

GEORGE E. PICKUP.